UNITED STATES PATENT OFFICE.

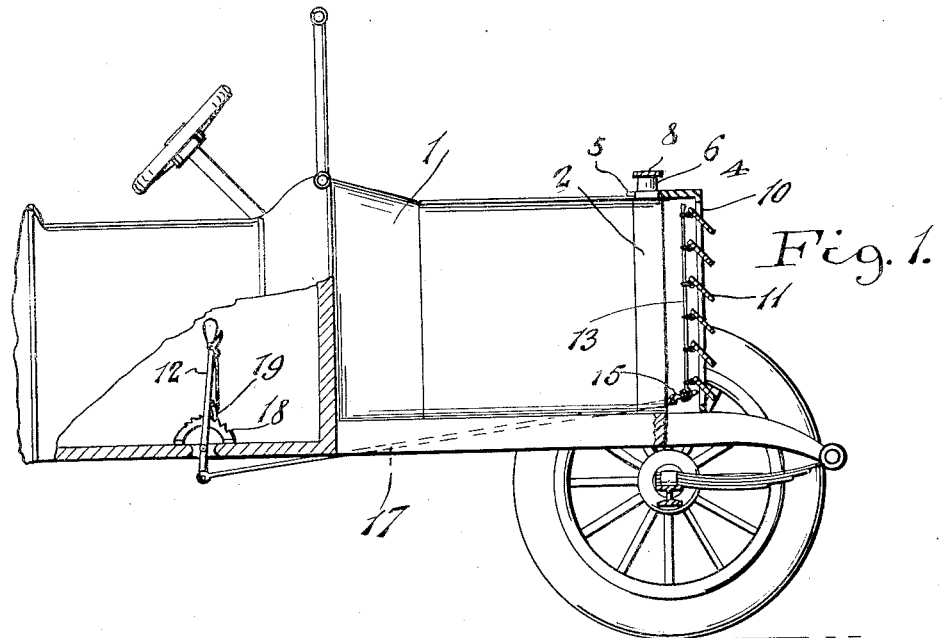

FRANK L. KELZER, OF CHASKA, MINNESOTA.

AUTOMOBILE-VENTILATOR.

1,343,919.  Specification of Letters Patent. Patented June 22, 1920.

Application filed March 17, 1916. Serial No. 84,858.

*To all whom it may concern:*

Be it known that I, FRANK L. KELZER, a citizen of the United States, residing at Chaska, in the county of Carver and State of Minnesota, have invented certain new and useful Improvements in Automobile-Ventilators; and I do hereby declare the following to be a full, clear, and exact description of the invention, such as will enable others skilled in the art to which it appertains to make and use the same.

This invention relates to new and useful improvements in an automobile ventilator and one of its objects is the provision of a device of this character, which shall be simple, durable and efficient, and which may be manufactured and sold at a comparatively low cost.

Another object of this invention is to provide a frame, having a flange formed on the top and sides thereof to fit over the radiator of the automobile to prevent air from coming in contact with the sides of the radiator to aid in preventing the water within the radiator from becoming frozen in cold weather.

A further object of this invention is to provide the frame opened in the front thereof and adapted to be closed by a plurality of shutters controlled by a lever positioned in convenient reach of the operator of the automobile, whereby the ventilating of the radiator may be readily regulated according to the temperature of the weather and which may be entirely cut off in very cold weather to facilitate correct running of the engine and further aid in preventing the water from freezing when the engine is standing idle.

A still further object of this invention is to provide a novel means of operating the plurality of shutters simultaneously, whereby they may be moved to a closed or open position or may be positioned in a partially closed position to regulate the temperature of water within the radiator, to facilitate smooth or even running of the engine under all temperatures of weather.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a vertical sectional view of an automobile ventilator constructed in accordance with my invention, illustrating it applied to an automobile, Fig. 2 is a rear elevation of the same, illustrating it detached from the automobile, and Fig. 3 is a longitudinal sectional view, illustrating the flanges engaging the radiator.

Referring in detail to the drawing, the numeral 1 indicates an automobile and 2, the radiator, to which my invention is attached.

A frame 3 of the same shape as the radiator 2 is provided with a rearwardly extending flange 4 on the sides and top thereof and adapted to engage the radiator 2, to prevent air from passing in between the sides and top of the frame and the radiator. A suitable loop or bracket 5 is secured to the top flange 4 and receives the neck 6 of the filling spout of the radiator by removing the cap 8, to support and hold the upper end of the frame 3 to the radiator. Formed on the flanges 4 adjacent the lower end thereof are brackets 9 which are apertured to receive the bolts which secures the radiator to the chassis of the automobile 1.

The frame 3 is provided with an opening 10 approximately the size of the opening in the front of the radiator, to allow a circulation of air through the radiator. A plurality of shutters 11 are journaled in the frame 3 and extend transversely of the opening 10 and adapted to close and open the opening 10 upon the movement of a controlling lever 12, which will be hereinafter more fully described.

A vertically extending rod 13 is secured to each of the shutters 11 at the rear thereof, for opening and closing the shutters 11 upon the downward and upward movement of the rod 13. A crank shaft 14, having a crank arm 15 is pivotally secured to the lower end of the rod 13 and journaled in the sides of the frame 3. A crank arm 16 is formed on one end of the crank shaft 14 and is pivotally connected to an operating rod 17, which is pivoted at the other end thereof to the controlling lever 12. The controlling lever 12 is pivoted to a segmental rack 18 that is secured to the frame of the automobile and is provided with teeth to be engaged by a dog 19 carried by the controlling lever 12, to lock the controlling lever at any desired position to regulate the positions of the shutters 11.

A suitable cover 20 may be placed over the hood of the automobile 1 and the sides and top of the radiator 2, to protect the engine of the automobile in cold weather.

In operation, when the controlling lever 12 is pushed forward, the vertical extending rod 13 will be moved upwardly, causing the shutters 11 to move into a closed position, thus cutting off the entire circulation of air to the radiator. By pulling rearwardly upon the controlling lever 12, the shutters 11 will be moved to an opened position and upon stopping the controlling lever 12 at various points along the segmental rack 18, the shutters 11 may be positioned at various angles to regulate the circulation of air to the radiator.

While I have shown and described the preferred embodiment of my invention, it will be understood that minor changes in construction, combination and arrangement of parts may be made without departing from the spirit and scope of the invention as claimed.

Having thus described my invention, what I claim is:—

An automobile ventilator comprising a frame including top and side members adapted to engage the sides and top of a radiator and project beyond the same, right angle flanges formed on said members and overlying the front of the radiator in spaced relation thereto and coöperating with each other to define an opening substantially the size of the opening of the radiator, a bracket secured to the top member and receiving the filling spout of the radiator, transversely extending shutters journaled to the edges of the side flanges, a vertical rod connected to said shutters and located in rear thereof, a transversely extending crank shaft journaled to the lower ends of the side members and connected to the lower end of said rod, operating means connected to said shaft, and horizontally disposed ears formed on the lower ends of the side members and adapted to receive the fastening elements of the radiator which secure it to the frame of the automobile.

In testimony whereof I affix my signature in presence of two witnesses.

FRANK L. KELZER.

Witnesses:
GEO. A. DU POIT,
HURBERT KELZER.